United States Patent [19]

Hart et al.

[11] Patent Number: 4,629,321

[45] Date of Patent: Dec. 16, 1986

[54] GRADE SETTING AND CALIBRATION ARRANGEMENT FOR LASER BEAM PROJECTION DEVICE

[75] Inventors: Edward E. Hart, Springfield; Ted L. Teach, Dayton, both of Ohio

[73] Assignee: Spectra-Physics, Inc., San Jose, Calif.

[21] Appl. No.: 781,095

[22] Filed: Sep. 27, 1985

[51] Int. Cl.$^4$ .............................................. G01C 9/00
[52] U.S. Cl. ..................................... 356/248; 356/148
[58] Field of Search ................ 356/140, 148, 149, 248

[56] References Cited

U.S. PATENT DOCUMENTS

| | | | |
|---|---|---|---|
| 3,876,309 | 4/1975 | Zicaro et al. | 356/248 X |
| 4,062,634 | 12/1977 | Rando et al. | 356/248 |
| 4,136,962 | 1/1979 | Brouwer et al. | 356/248 |
| 4,162,708 | 7/1979 | Johnson | 172/45 |
| 4,221,483 | 9/1980 | Rando | 356/250 |

Primary Examiner—Eugene R. LaRoche
Assistant Examiner—Robert J. Pascal
Attorney, Agent, or Firm—Killworth, Gottman, Hagan & Schaeff

[57] ABSTRACT

An arrangement for use in a laser beam projection device for controlling the orientation of a support frame upon which a laser beam source is mounted includes a base frame, a support frame, and a pivot for mounting the support frame on the base frame. A level arm is pivotally supported at one point by the support frame and carries a level vial which provides an electrical indication of the orientation of the level arm. A positioning arrangement engages the support frame and the level arm and adjusts their relative position. The positioning arrangement includes a threaded shaft having a first threaded portion engaging the support frame and a nut engaging a second threaded portion of the shaft. The nut contacts the level arm. By rotating the nut, the relative position of the level arm and the support frame are adjusted. Differing thread pitches for the two threaded portions are provided and rotation of the threaded shaft while holding the nut stationary thus allows very fine adjustments to be made in relative positions between the parts, thus facilitating calibration. A flexible cable extending from the nut to a knob mounted on the base frame and a spline attached to the end of the cable and received within an appropriately shaped opening on the knob permit the nut to be rotated for appropriate setting without hindering movement of the support frame or the level arm.

18 Claims, 4 Drawing Figures

GRADE SETTING AND CALIBRATION ARRANGEMENT FOR LASER BEAM PROJECTION DEVICE

BACKGROUND OF THE INVENTION

The present invention relates to a laser beam projection device and, more particularly, to an arrangement for permitting control and calibration of the orientation of a rotating laser beam.

A number of different laser beam systems have been employed in the past for surveying and construction applications to provide a rotating reference beam of laser light. This reference plane of light permits ready measurement of elevations and grades. Further, earth moving and other construction equipment may be fitted with laser light sensing devices which may be coupled through control systems to effect automatic or semiautomatic control of the equipment.

A laser beam projector typically employs a rotating pentaprism assembly which sweeps the beam in a horizontal plane or a selected tilted plane. Some prior art projectors have included visually readable level vials and manually adjustable screws for orienting the projector in the desired attitude. Such a projector is disadvantageous in that its accuracy is dependent in part upon the skill of the operator in the initial adjustment of the orientation of the projector. Moreover, a subsequent unnoticed disturbance of the device can cause erroneous measurements to be taken.

A projection device having significant advantages over prior art devices is shown in U.S. Pat. No. 4,062,634, issued Dec. 13, 1977, to Rando et al, and assigned to the present invention. The system disclosed in the Rando et al patent is one in which orientation of the laser beam reference plane is accomplished automatically. A support frame for the laser source is pivotally mounted on the base frame of the Rando et al device. The support frame carries electrical sensor vials which sense the orientation of the support frame and provide electrical signals used by a feedback control system. The control system actuates electric motors to move the support frame into a position in which the vials are leveled. The vials are mounted on the support frame in such a manner that their positions may be adjusted by grade motors. When the reference laser plane is to be oriented at an angle to the horizontal, a grade motor is actuated by the operator to tilt the vial with respect to the support frame. The amount of tilt is displayed on a counter also attached to the motor. The feedback control system then reorients the support frame to bring the vial back into its level position, thus tilting the frame by the desired amount.

It will be appreciated that this requires a number of motors to accomplish the orientation of the vials and the support frame, and is relatively complex and expensive. Additionally, initial calibration of the system shown in Rando et al is not as easily accomplished as may be desired.

Accordingly, it is seen that there is a need for an arrangement for use in a laser beam projection device which controls the orientation of a support frame in a simple fashion, and which facilitates calibration of the projection device.

SUMMARY OF THE INVENTION

An arrangement for use in a light beam projection device for controlling the orientation of a support frame associated with a light beam source includes a base frame, a support frame, a pivot means for pivotally mounting the support frame on the base frame, and a level arm means. The level arm means is pivotally supported at one point by the support frame, and provides an electrical indication of orientation such as that the level arm means may be moved to a reference orientation. A positioning means engages the support frame and the level arm means at a point spaced from the point at which the level arm means is pivotally supported by the support frame.

The positioning means includes a threaded shaft having a first threaded portion engaging the support frame, means for resisting rotation of the shaft with respect to the support frame, and a nut contacting the level arm means and holding the level arms means in a selected orientation with respect to the support frame. The nut engages a second threaded portion of the shaft which has a different thread pitch than the first threaded portion. Rotation of the threaded shaft with respect to both the support frame and the level arm means results in fine adjustment in the relative positions thereof for purposes of calibration. The positioning means further includes adjustment means for rotating the nut to produce coarse adjustment in the relative positions of the support frame and the level arm means.

The adjustment means comprises a control knob rotatably mounted on the base frame, and a flexible cable engaged by the control knob and attached to the nut, whereby rotation of the nut for coarse adjustment in the relative positions of the support frame and the level arm means may be effected without restricting movement thereof. A counter means is connected to the control knob to provide an indication of the setting of the knob, thereby indicating the relative position of the support frame and the level arm means and determining the orientation of the support frame. The nut may be generally spherical over at least a portion of its exterior surface, and the level arm means may include a bearing element defining a concave, generally spherical surface for receiving the nut.

The threaded shaft includes a calibration means permitting engagement and rotation of the threaded shaft with respect to both the support frame and the level arm means. The calibration means comprises a screw head on the end of the shaft to facilitate rotation thereof. The means for resisting rotation of the shaft may comprise a set screw element, and a threaded opening in the support frame for receiving the set screw element and permitting the set screw element to contact the shaft and prevent rotation thereof.

The thread pitch in the first threaded portion and the thread pitch in the second threaded portion may differ by approximately 10 percent or less.

The flexible cable may include a spline member on the end thereof opposite the nut and the knob may define an opening shaped to receive the spline member, whereby the know may rotate the spline member without restricting movement of the member in a direction parallel to the axis of rotation thereof.

The arrangement may include a level arm means which provides multiple indications of orientation and a pair of positioning means each engaging the support frame and the level arm means at points spaced orthogonally with respect to the point at which the level arm means is pivotally supported by the support means. This permits the relative positions of the support frame and the level arm means to be adjusted independently by independent relative movement about either of the pair of orthogonal axes, controlling the orientation of the support frame.

Accordingly, it is an object of the present invention to provide an arrangement for use in a light projection device for controlling the orientation of a support frame associated with a light beam source in which the relative position of the support frame and a level arm means are controlled by a positioning means including a threaded shaft having a first threaded portion engaging the support frame and a second threaded portion engaged by a nut contacting the level arm means; to provide such an arrangement in which the nut is rotated by a manual adjustment means including a flexible cable extending to a control knob rotatably mounted on a base frame; to provide such an arrangement in which the first and second threaded portions of the threaded shaft have differing thread pitches such that rotation of the shaft with the nut stationary produces fine adjustment in the relative positions of the level arm means and the support frame for purposes of calibration; and to provide such an arrangement in which orientation of the support frame may be adjusted independently and calibrated with respect to two orthogonal axes.

Other objects and advantages of the invention will be apparent from the following description, the accompanying drawings and the appended claims.

DETAILED DESCRIPTION OF THE PREFERRED EMBODIMENT

Figure 1:
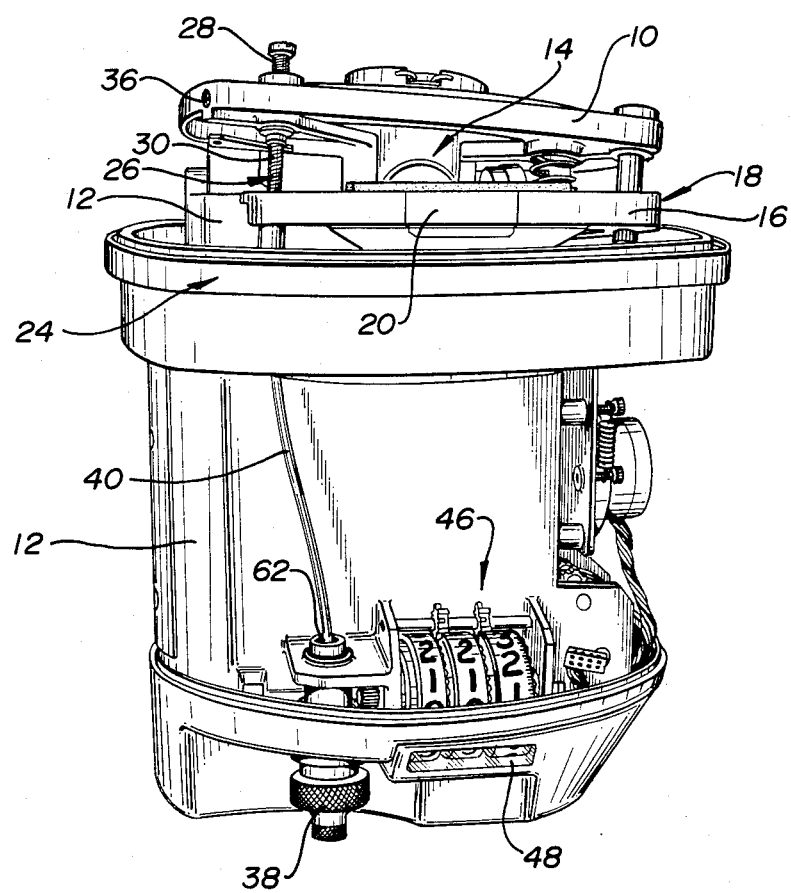
FIG. 1 is a perspective view of a portion of a laser beam projection device constructed according to the present invention, with part of the casing of the device removed.

Reference is now made to FIGS. 1–4 which illustrate a portion of a laser beam projection device constructed according to the invention which controls the orientation of a support frame 10 upon which a laser beam source (not shown) is mounted. The laser beam source, which may be an infrared diode laser, directs the beam upward through lens 13. The beam is then deflected at a right angle by a rotating pentaprism assembly (not shown), which is supported on top of the frame 10, so as to define a reference plane. The pentaprism assembly and a covering transparent structure have been removed from FIGS. 1–4 for purposes of clarity. The pentaprism assembly reflects the beam at an angle of 90° to the incident beam path. Therefore, the orientation of the reference plane is directly related to the orientation of the beam emerging from the lens 13.

A base frame 12 is provided to which the major assemblies of the projection device are attached. A pivot means 14, which may take the form of a gimbal mounting arrangement, pivotally mounts the support frame 10 on the base frame 12. This gimbal mounting structure permits the support frame 10 to pivot independently about two orthoganal axis, parallel to and normal to the plane of FIGS. 2 and 4. Initially, however, the following discussion is limited to the apparatus by which the support frame 10 is moved about an axis normal to the plane of FIGS. 2 and 4 to a desired position.

A level arm means 16, pivotally supported at one point 18 by the support frame 10, includes a level vial 20 of the type known in the prior art. The level vial provides an electrical indication of the orientation of the level arm means 16. This permits the level arm means to be moved to a horizontal reference orientation by a control system operating a motor (not shown) operatively connected thereto.

A positioning means 22 engages the support frame 10 and the level arm means 16 at a point 24 which is spaced from the point 18 at which the level arm means 16 is pivotally supported by the support frame 10. The positioning means 22 includes a threaded shaft 26 having a first threaded portion 28 engaging the support frame 10, and a second threaded portion 30 engaging nut 32. A means for resisting rotation of shaft 26 may comprise a plastic tipped screw 34 in threading opening 36, such screw providing a frictional loading of the shaft 26 with respect to the support frame 10, resisting turning of the shaft. Alternatively, a set screw element, including a piece of Teflon material or other suitable material and a screw, may be positioned in opeing 36 (with the Teflon material held against shaft 26) by the screw. The second threaded portion 30 of the shaft 26 has a different thread pitch than the first threaded portion 28, whereby rotation of the shaft 28 wih respect to both the support frame 10 and the level arm means 16 results in fine adjustment in the relative positions thereof for purposes of calibration. An adjustment means, including a control knob 38 and a flexible cable 40 provides a means for rotating the nut 32 to produce course adjustment in the relative position of the support frame 10 and the level arm means 16. The control knob 38 is rotatably mounted on the base frame 12 and is connected via crown gear 42 and gear 44 to a mechanical counter 46 which provides a numerical indication through window 48 of the rotation of the knob 38 with respect to a calibrated position.

Assuming that the device is properly calibrated and that the counter 46 is set for "zero" grade, i.e., a horizontal reference plane, the circuitry responsive to the level vial 20 will cause the support frame 10 and the arm 16 to be pivoted until the vial is in its null or reference position and this will result in the frame 10 being oriented horizontally with a high degree of accuracy. As a consequence, the laser beam will be directed vertically.

When the knob 38 is rotated, the end 24 of the arm 16 is dropped slightly as nut 32 moves down shaft 30. Note that the exterior surface of nut 32 and the mating interior surface of bearing element 50 are both generally spherical in shape to facilitate this movement. The opposite end of the level arm means 16 includes a pivot element 52 which rides on a spherical support 54 on shaft 56. Level arm means 16 and support frame 10 are urged apart under the influence of spring 58 positioned near shaft 56.

When the non-horizontal orientation of the vial 20 is sensed, the arm 16 and support frame 10 are then pivoted on the gimbal mounting 14 to return the arm 16 to its generally horizontal position, as shown in FIG. 1. This results in tilting support frame 10 and thus produces a tilted or graded reference plane defined by the rotating laser beam.

In order to facilitate the calibration operation by which the initial orientation of the level arm means 16 with respect to the support frame 10 is set, shaft 26 includes two sections, 28 and 30, which each have differing thread pitches. As an example, portion 28 may define 86 threads per inch, whereas portion 30 may define 80 threads per inch. During normal operation, therefore, one revolution of cable 40 and nut 32 moves the ends of frame 10 and level arm means 16 together by 12.5 mills. In contrast, during the calibration operation the nut 32 is held stationary and the shaft 26 engaged with a screw driver at 60. The counter 46 is set to read "zero", indicating a horizontal reference plane and a vertical beam path for the beam exiting lens 13, assuming that the device is properly calibrated. The path of the beam is sensed with an appropriate target and shaft 26 is rotated as needed to produce such a vertical beam path. One turn of the shaft 26 alters the relative positions of the frame 10 and arm means 16 by 1/80–1/86 inch, or approximately 0.87 mills. It will be appreciated that this arrangement permits very fine adjustment of the relative position of the level arm means 16 and the frame 10 during calibration, while permitting somewhat coarser adjustment of the relative position of these assemblies during operation of the device. The thread pitches of sections 28 and 30 differ by a predetermined amount to provide the sensitivity required for calibration.

As mentioned previously, knob 38 is mounted on the base frame 12. In order to permit the support frame 10 to move freely with respect to base frame 12 and without hindrance by cable 40, knob 38 is not rigidly secured to cable 40. Rather, knob 38 defines a square opening 62 which receives a square spline member 64 therein. Spline member 64 is attached to the lower end of cable 40. By this arrangement, the knob 38 may rotate the spline member 64 without restricting the movement of the spline member and the cable 40 in a direction parallel to the axis of rotation of the knob 38, as indicated by arrow 66 in FIG. 2. It will be appreciated that other spline geometries may also be utilized.

Figure 2:
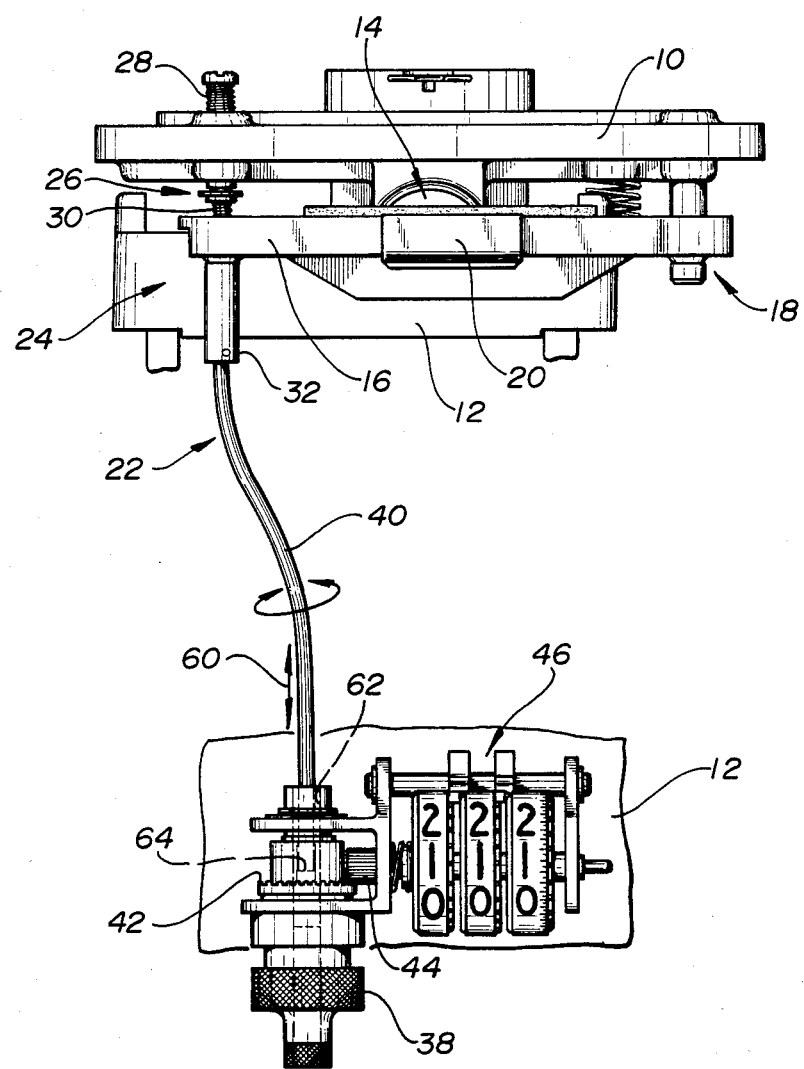
FIG. 2 is a side view of the device, with portions of the base frame and other structure broken away.
Figure 3:
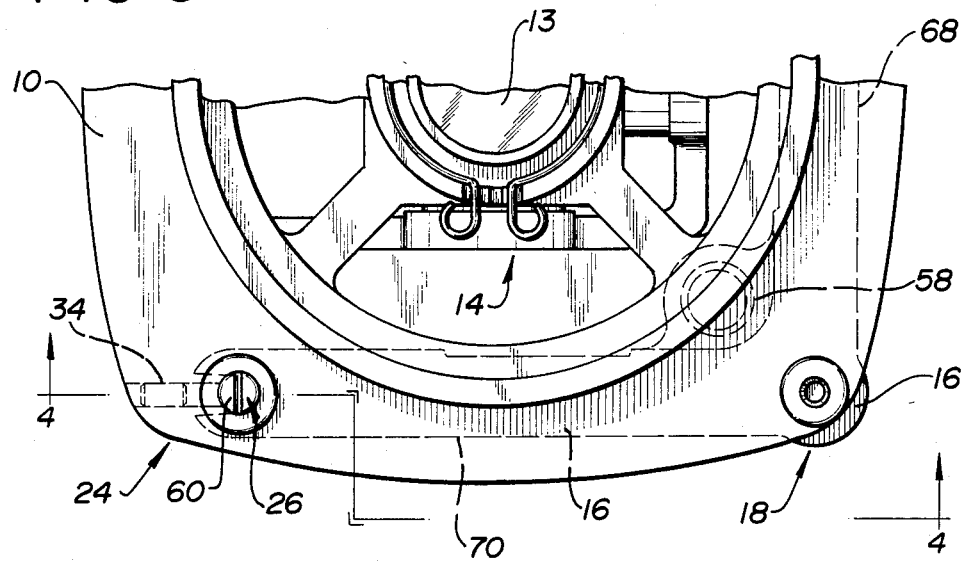
FIG. 3 is an enlarged partial top view of the device.
Figure 4:
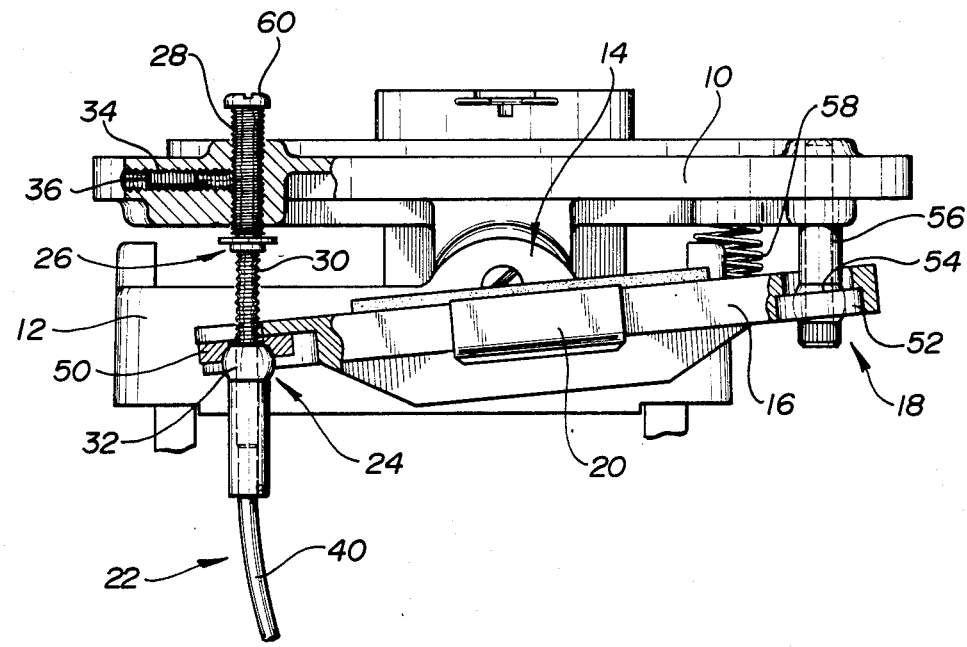
FIG. 4 is a view of the device taken generally along line 4—4 in FIG. 3.

The previous discussion has been limited to the means of adjustment and calibration of the projection device about an axis generally normal to the plane of FIGS. 2 and 4. As may be seen in FIG. 3, however, the level arm means is generally L shaped and, as a result of the pivot arrangement at 18, is pivotally mounted for independent movement about either of two axes, both parallel and perpendicular to the plane of FIGS. 2 and 4. The pivot means 14, configured as a gimbal arrangement, supports the frame 10 such that it is independently pivotable in either of the two axes. To provide for positioning the support frame in both axes, a second positioning means, precisely mirroring the positioning means illustrated in FIG. 2, is associated with leg 68 of the level arm means 16. This second positioning means engages the level arm means 16 at a point spaced orthogonally from the point 24 at which the leg 70 of the level arm means 16 is engaged by positioning means 22. The relative positions of the support frame and the level arm means may thus be adjusted and calibrated independently about either of the pair of orthogonal axes.

Having described the invention in detail and by reference to preferred embodiments thereof, it will be apparent that modifications and variations are possible without departing from the scope of the invention defined in the appended claims. For instance, although the laser beam source is mounted on and moves with the support frame 10 in the above described embodiment, it will be apparent that a projection device may be configured according to the present invention with a stationary laser beam source mounted below the support frame 10 on the base frame 12, and with appropriate optics mounted on the support frame in the path of the beam for diverting the beam into the desired orientation.

What is claimed is:

1. An arrangement for use in a light beam projection device for controlling the orientation of a support frame associated with a light beam source, comprising:
   a base frame,
   a support frame,
   a pivot means for pivotally mounting said support frame on said base frame,
   level arms means, pivotally supported at one point by said support frame, for providing an electrical indication of orientation such that said level arm means may be moved to a reference orientation, and
   positioning means, engaging said support frame and said level arm means at a point spaced from the point at which said level arm means is pivotally supported by said support frame, said positioning means including
   a threaded shaft having a first threaded portion engaging said support frame,
   means for resisting rotation of said shaft with respect to said support frame,
   a nut contacting said level arm means and holding said level arm means in a selected orientation with respect to said support frame, said nut engaging a second threaded portion of said shaft having a different thread pitch than said first threaded portion, whereby rotation of said threaded shaft with respect to both said support frame and said level arm means results in fine adjustment in the relative position thereof for purposes of calibration, and
   adjustment means for rotating said nut to produce coarse adjustment in the relative position of said support frame and said level arm means.

2. The arrangement of claim 1 in which said adjustment means comprises
   a control knob rotatably mounted on said base frame, and
   a flexible cable engaged by said control knob and attached to said nut, whereby rotation of said nut for coarse adjustment in the relative position of said support frame and said level arm means may be effected without restricting movement thereof.

3. The arrangement of claim 2 further comprising counter means connected to said control knob to provide an indication of rotation of said knob, whereby the relative position of said support frame and said level arm means may be set to produce a selected orientation of said support frame.

4. The arrangement of claim 3 in which said nut is generally sperical over at least a portion of its exterior surface, and in which said level arm means includes a bearing element defining a concave, generally spherical surface for receiving said nut.

5. The arrangement of claim 1 in which said threaded shaft includes a calibration means permitting engagement and rotation of said threaded shaft simultaneously with respect to both said support frame and said level arm means.

6. The arrangement of claim 5 in which said calibration means comprises a screw head on the end of said shaft to facilitate rotation thereof.

7. The arrangement of claim 1 in which said means for resisting comprises a set screw element, and a threaded opening in said support frame for receiving said set screw element and permitting said set screw element to contact said shaft.

8. The arrangement of claim 1 in which the thread pitch in said first threaded portion and the thread pitch in said second threaded portion differ by approximately 10 percent or less.

9. The arrangement of claim 2 in which said flexible cable includes a spline member on the end thereof opposite said nut, and in which said knob defines an opening shaped to receive said spline member, whereby said knob may rotate said spline member without restricting movement of said member in a direction parallel to the axis of rotation thereof.

10. An arrangement for use in a light projection device for controlling the orientation of a support frame associated with a light beam source, comprising:
a base frame,
a support frame,
a pivot means for pivotally mounting said support frame on said base frame, said support frame being independently pivotable in either of two axes.
level arm means, pivotally supported at one point by said support frame, for providing electrical indications of orientation such that said level arm means may be moved to a reference orientation, and
a pair of positioning means, each of which engages said support frame and said level arm means at an associated one of a pair of points spaced orthogonally from the point at which said level arm means is pivotally supported by said support means, such that the relative positions of said support frame and said level arm means may be adjusted independently about either of a pair of orthogonal axes, each of said pair of positioning means including
a threaded shaft having a first threaded portion engaging said support frame,
means for resisting rotation of said shaft with respect to said support frame,
a nut contacting said level arm means and holding said level arm means in a selected orientation with respect to one of said axes, said nut engaging a second threaded portion of said shaft having a different thread pitch than said first threaded portion, whereby rotation of said threaded shaft with respect to both said support frame and said level arm means results in fine adjustment in the relative position thereof for purposes of calibration, and
adjustment means for rotating said nut to produce coarse adjustment in the relative position of said support frame and said level arm means.

11. The arrangement of claim 10 in which said adjustment means comprises
a control knob rotatably mounted on said base frame, and
a flexible cable engaged by said control knob and attached to said nut, whereby rotation of said nut for coarse adjustment in the relative position of said support frame and said level arm means may be effected without restricting movement thereof.

12. The arrangement of claim 11 further comprising counter means connected to said control knob to provide an indication of rotation of said knob, whereby the relative position of said support frame and said level arm means may be set to produce a selected orientation of said support frame.

13. The arrangement of claim 12 in which said nut is generally spherical over at least a portion of its exterior surface, and in which said level arm means includes a bearing element defining a concave, generally spherical surface for receiving said nut.

14. The arrangement of claim 10 in which said threaded shaft includes a calibration means permitting engagement and rotation of said threaded shaft simultaneously with respect to both said support frame and said level arm means.

15. The arrangement of claim 14 in which said calibration means comprises a screw head on the end of said shaft to facilitate rotation thereof.

16. The arrangement of claim 10 in which said stop comprises a set screw element, and a threaded opening in said support frame for receiving said set screw element and permitting said set screw element to contact said shaft.

17. The arrangement of claim 10 in which the thread pitch in said first threaded portion and the thread pitch in said second threaded portion differ by approximately 10 percent or less.

18. The arrangement of claim 11 in which said flexible cable includes a spline member on the end thereof opposite said nut, and in which said knob defines an opening shaped to receive said spline member, whereby said knob may rotate said spline member without restricting movement of said member in a direction parallel to the axis of rotation thereof.

* * * * *